United States Patent
Ochiai et al.

(10) Patent No.: US 6,865,182 B2
(45) Date of Patent: Mar. 8, 2005

(54) DATA TRANSFER METHOD INCLUDING RECOGNIZING IDENTICAL MESSAGES AND COMMUNICATION APPARATUS USING THE METHOD

(75) Inventors: Hironori Ochiai, Fukuoka (JP); Yuji Ito, Fukuoka (JP); Akinori Kubota, Fukuoka (JP); Yasuhide Tsuru, Fukuoka (JP); Masahiro Hayashi, Fukuoka (JP); Takao Shikama, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 865 days.

(21) Appl. No.: 09/817,325

(22) Filed: Mar. 26, 2001

(65) Prior Publication Data

US 2002/0019878 A1 Feb. 14, 2002

(30) Foreign Application Priority Data

Aug. 11, 2000 (JP) .................................... 2000-245257

(51) Int. Cl.$^7$ ............................................. H04L 12/28
(52) U.S. Cl. ...................................... 370/390; 370/432
(58) Field of Search ................................ 370/235, 236, 370/390, 432, 537, 237, 238, 229, 397, 398, 409

(56) References Cited

U.S. PATENT DOCUMENTS

| 5,282,207 | A | * | 1/1994 | Jurkevich et al. | ........... 370/468 |
|---|---|---|---|---|---|
| 5,959,989 | A | * | 9/1999 | Gleeson et al. | ............. 370/390 |
| 6,167,051 | A | * | 12/2000 | Nagami et al. | ............. 370/397 |
| 6,272,111 | B1 | * | 8/2001 | Murase | ........................ 370/237 |
| 6,353,596 | B1 | * | 3/2002 | Grossglauser et al. | ...... 370/256 |
| 6,389,038 | B1 | * | 5/2002 | Goldberg et al. | ........... 370/471 |
| 6,539,022 | B1 | * | 3/2003 | Virgile | ........................ 370/401 |
| 6,654,373 | B1 | * | 11/2003 | Maher et al. | ................ 370/392 |

FOREIGN PATENT DOCUMENTS

JP           09214509           8/1997

* cited by examiner

*Primary Examiner*—Hassan Kizou
*Assistant Examiner*—Dmitry Levitan
(74) *Attorney, Agent, or Firm*—Katten Muchin Zavis Rosenman

(57) ABSTRACT

In a data transfer method and apparatus of the present invention, multiple data frames are received from a preceding node of a network of communication units, and the received data frames are routed to a next node of the network. It is detected whether each of the multiple data frames is addressed to another communication unit. It is detected whether the data frames that are detected as being addressed to another communication unit contain identical messages. The data frames that are detected as containing different destinations and identical messages are assembled into an integrated data frame, so that the integrated data frame is transmitted to the next node. A selected next-node equipment identifier is supplied, which indicates a selected next-node communication unit of the network that receives the integrated data frame. When the selected next-node equipment identifier and the integrated data frame are received, the integrated data frame is transmitted to the selected next-node communication unit via the network.

8 Claims, 16 Drawing Sheets

FIG.13A

ROUTER R1

| SRC IP ADDR | SND INFO | MSSG ID | ASSM RTR IP ADDR | GRP ID | DST RTR IP ADDR | DSTN IP ADDR | FRM PRC | RCV INFO | SRC PRT No. |
|---|---|---|---|---|---|---|---|---|---|
| S1 | S1 | 1234 | R1 | 1 | R2 | S2 | DST | S2 | 1001 |
| S1 | S1 | 1234 | R1 | 1 | R2 | R4 | RT | S3/S4 | — |
| S1 | S1 | 1234 | R1 | 1 | R4 | S3 | DST | S3 | 1002 |
| S1 | S1 | 1234 | R1 | 1 | R4 | S4 | DST | S4 | 1003 |

FIG.13B

ROUTER R2

| SRC IP ADDR | SND INFO | MSSG ID | ASSM RTR IP ADDR | GRP ID | DST RTR IP ADDR | DSTN IP ADDR | FRM PRC | RCV INFO | SRC PRT No. |
|---|---|---|---|---|---|---|---|---|---|
| S1 | S1 | 1234 | R1 | 1 | R2 | S2 | DST | S2 | — |
| S1 | S1 | 1234 | R1 | 1 | R2 | R4 | RT | S3/S4 | — |
| S1 | S1 | 1234 | R1 | 1 | R4 | S3 | DST | S3 | — |
| S1 | S1 | 1234 | R1 | 1 | R4 | S4 | DST | S4 | — |

FIG.13C

ROUTER R4

| SRC IP ADDR | SND INFO | MSSG ID | ASSM RTR IP ADDR | GRP ID | DST RTR IP ADDR | DSTN IP ADDR | FRM PRC | RCV INFO | SRC PRT No. |
|---|---|---|---|---|---|---|---|---|---|
| S1 | S1 | 1234 | R1 | 1 | R2 | S2 | DST | S2 | — |
| S1 | S1 | 1234 | R1 | 1 | R2 | R4 | RT | S3/S4 | — |
| S1 | S1 | 1234 | R1 | 1 | R4 | S3 | DST | S3 | — |
| S1 | S1 | 1234 | R1 | 1 | R4 | S4 | DST | S4 | — |

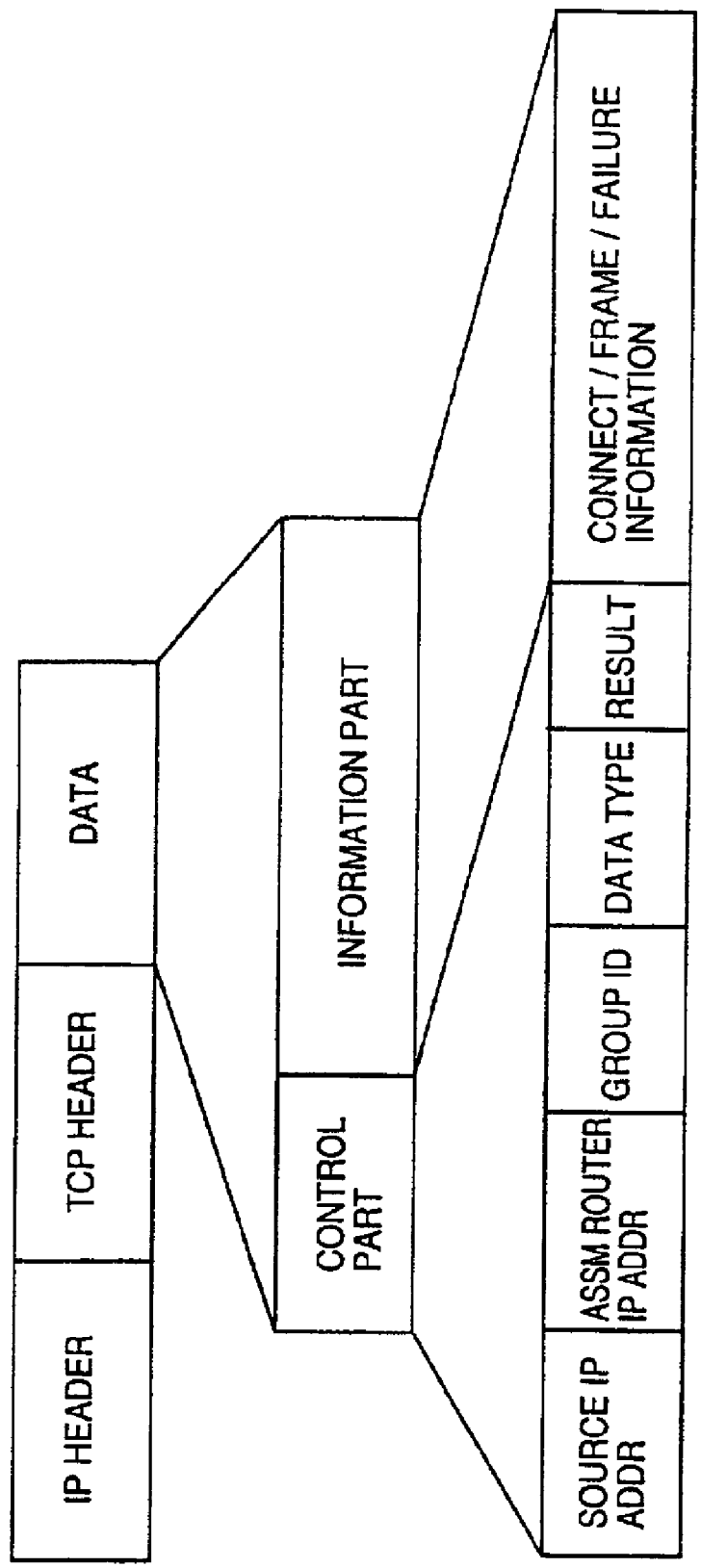

DATA TRANSFER METHOD INCLUDING RECOGNIZING IDENTICAL MESSAGES AND COMMUNICATION APPARATUS USING THE METHOD

BACKGROUND OF THE INVENTION

1. Field of the Invention

The present invention relates to a data transfer method and a communication apparatus that uses the data transfer method to control data traffic transmitted across a network.

2. Description of the Related Art

FIG. 1 is a block diagram of a conventional router.

As shown in FIG. 1, in the conventional router 10, a LAN frame receiver unit (LFR) 12 receives a LAN frame from the network, and passes the received LAN frame on to a routing unit (RT) 14. The routing unit 14 performs the routing of the received LAN frame and passes it on to a LAN frame transmitter unit (LFT) 16. The LFT 16 transmits the LAN frame to the intended destination via the network.

FIG. 2 is a diagram for explaining a transfer of multiple mails across a network using a conventional mail transfer method, the mails including identical messages and different destinations. FIG. 3 is a sequence diagram for explaining a communication sequence when the mail transfer is performed as shown in FIG. 2.

Suppose that, in the mail transfer of FIG. 2, a mail server S1 is the source that sends three mails to the IP (Internet Protocol) network, and mail servers S2, S3 and S4 are the respective destinations that receive the mails from the IP network. One of the mails (indicated by "MAIL-S2" in FIG. 3) is sent from S1 to S2, the second (indicated by "MAIL-S3" in FIG. 3) is sent from S1 to S3, and the last (indicated by "MAIL-S4" in FIG. 3) is sent from S1 to S4. The mails include identical messages (frame#n) and different destinations (S2, S3, S4). The mails are transmitted at the same time through a number of routers R1, R2, R3, R4 and R5 in the network to the respective destinations.

As shown in FIG. 2 and FIG. 3, when transmitting the mails from the server S1 to the servers S2, S3 and S4 included in the mailing list by using the conventional mail transfer method, the mails including the identical messages are simultaneously transferred from the server S1 to the servers S2, S3 and S4, independently. In the conventional routers, such as the routers R1 through R5, mail frames are routed in the same manner as other data frames, and a special recognition of mail frames is not performed. The respective mail frames are merely routed to the next-node equipment of the network by the conventional routers. Specifically, in the mail transfer of FIG. 2, the routing of a mail containing identical messages is repeated by the number of the corresponding mails between the router R1 and the router R2 and between the router R2 and the router R4.

The conventional routers are not provided with a mechanism for recognizing that multiple mail frames, including identical messages and different destinations, are transferred across the network from the source server to the destination servers. The respective mail frames, delivered from the source server, are merely routed to the next-node equipment of the network by the conventional routers. For this reason, when mail traffic on the transmission lines of the conventional routers is expected to increase, it is necessary to add additional transmission lines to the existing transmission lines of the conventional routers. There has been no other countermeasure that can be taken with the conventional routers.

In a case of mail traffic in local areas covered by one domain, such as cooperate LAN or Internet service provider (ISP) networks, the implementation of distributed mail servers can be the countermeasure for reduction of the increasing mail traffic.

However, in a case of mail traffic in the worldwide network spanning multiple domains, when a plurality of mail frames including identical messages and different destinations are transferred across such network from the source server to the destination servers, the load of mail traffic on the transmission lines where many domains are concentrated becomes heavy. Further, when transmitting mails with a large attachment file across such network, the load of mail traffic on the network resources becomes very heavy. The larger the number of mail servers installed, the heavier the load of mail traffic in the network. The larger the size of a mail frame transmitted across the network, the heavier the load of mail traffic in the network.

In recent years, with the proliferation of the Internet, the mail traffic, such as mailing list or e-mails with multiple destinations, has rapidly grown, which is liable to narrowing the band available to the routing lines in the network. There is an increasing demand for providing an effective mechanism for reduction of the increasing mail traffic in the worldwide network spanning multiple domains.

SUMMARY OF THE INVENTION

Accordingly, it is an object of the present invention to provide an improved data transfer method and apparatus in which the above-described problems are eliminated.

Another object of the present invention is to provide a data transfer method that effectively reduces the data traffic in the network when multiple data frames, including identical messages and different destinations, are transferred between the routers of the network.

Another object of the present invention is to provide a communication apparatus that effectively reduces the data traffic in the network when multiple data frames, including identical messages and different destinations, are transferred between the routers of the network.

The above-mentioned objects of the present invention are achieved by a data transfer method which routes multiple data frames from a preceding node to a next node in a network of communication units, the data transfer method comprising the steps of: detecting whether the multiple data frames received from the preceding node include different destinations; detecting whether the data frames that are detected as including different destinations include identical messages; assembling the data frames that are detected as including different destinations and identical messages into an integrated data frame so that the integrated data frame is transmitted to the next node; supplying a selected next-node equipment identifier, the next-node equipment identifier indicating a selected next-node communication unit of the network that receives the integrated data frame; and transmitting, when the selected next-node equipment identifier and the integrated data frame are received, the integrated data frame to the selected next-node communication unit via the network.

The above-mentioned objects of the present invention are achieved by a communication apparatus which routes multiple data frames from a preceding node to a next node in a network of communication units in accordance with a data transfer method, the communication apparatus comprising: a data destination detection unit which detects whether the multiple data frames received from the preceding node include different destinations; a data content detection unit which detects whether the data frames that are detected as including different destinations include identical messages; a data frame assembling unit which assembles the data frames that are detected as including different destinations and identical messages into an integrated data frame, so that the integrated data frame is transmitted to the next node; a next-node equipment selection unit which supplies a selected next-node equipment identifier, the next-node equipment identifier indicating a selected next-node communication unit of the network that receives the integrated data frame from the data frame assembling unit; and a data frame transmitter unit which transmits, when the selected next-node equipment identifier and the integrated data frame are received, the integrated data frame to the selected next-node communication unit via the network.

In the data transfer method and the communication apparatus of the present invention, the multiple data frames that are detected as containing identical messages and different destinations are assembled, at a first router, into an integrated data frame, and only the integrated data frame is transferred from the first router to one or more second routers in the network. Accordingly, the data transfer method and the communication apparatus of the present invention are effective in reducing the data traffic in the network when the multiple data frames, including identical messages and different destinations, are transferred between the routers of the network.

BRIEF DESCRIPTION OF THE DRAWINGS

Other objects, features and advantages of the present invention will become apparent from the following detailed description when read in conjunction with the accompanying drawings.

FIG. 13A, FIG. 13B and FIG. 13C are diagrams for explaining mail control information retained by the router of the network.

FIG. 14 is a diagram for explaining the format of mail control information used by the data transfer method of the invention.

DETAILED DESCRIPTION OF PREFERRED EMBODIMENTS

A description will now be provided of the preferred embodiments of the present invention with reference to the accompanying drawings.

Figure 4:
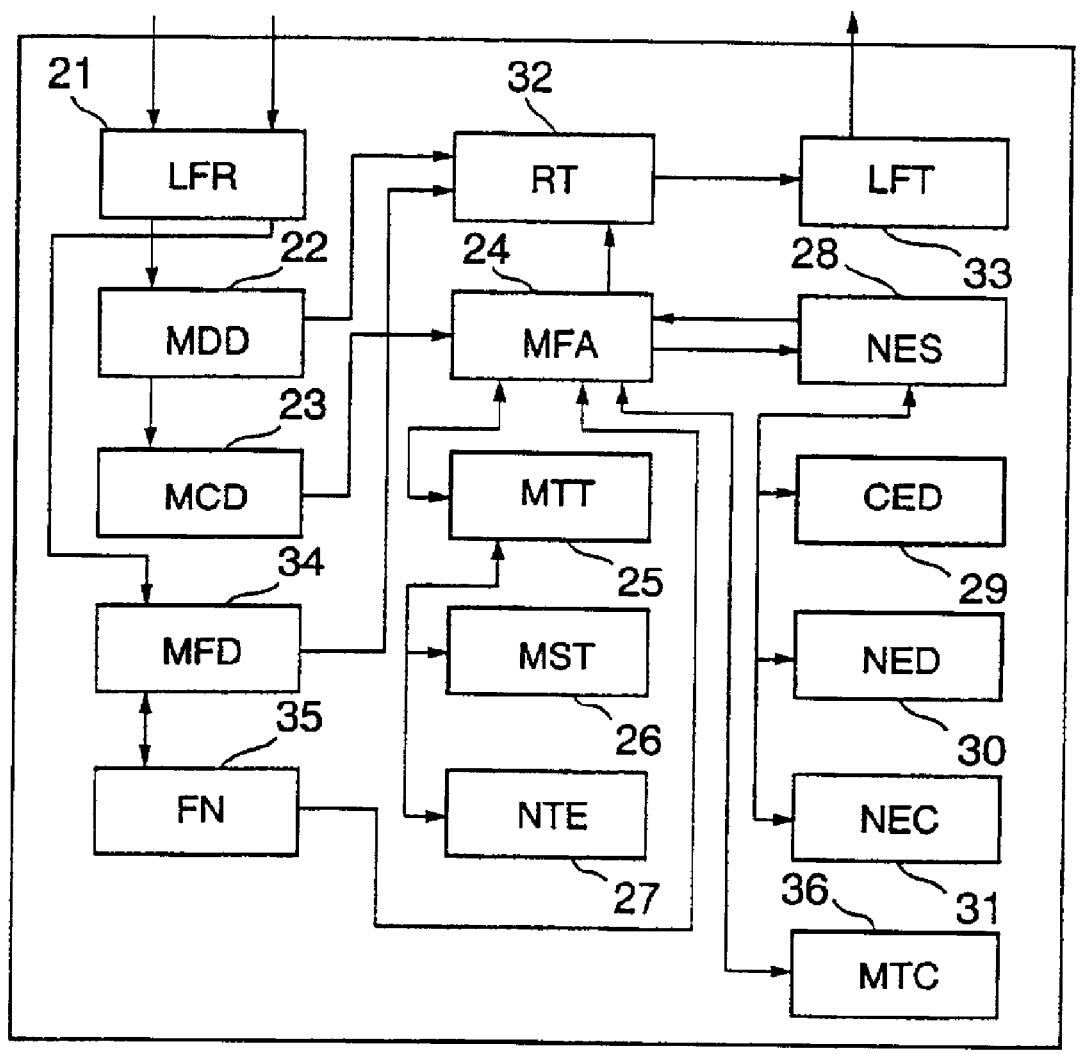
FIG. 4 is a block diagram of one preferred embodiment of the communication apparatus of the invention.

FIG. 4 is a block diagram of one preferred embodiment of the communication apparatus of the invention.

As shown in FIG. 4, a LAN frame receiver unit (LFR) 21 receives IP frames from an IP (Internet Protocol) network, and passes the received IP frames on to a mail destination detection unit (MDD) 22. The MDD 22 analyzes the header portion of each received IP frame. Specifically, in the present embodiment, the MDD 22 determines whether a protocol and a port number, contained in the header portion of each received frame, match with TCP and 25 (which indicates SMTP), respectively. TCP is the abbreviation of transmission control protocol, and SMTP is the abbreviation of simple mail transfer protocol.

When a match occurs, the MDD 22 determines that the received mail is addressed to another communication equipment, and passes the received IP frame on to a mail content detection unit (MCD) 23. When a match does not occur, the MDD 22 passes the received IP frame on to a routing unit (RT) 32. In the latter case, the routing unit 32 performs the routing of the received IP frame and passes it on to a LAN frame transmitter unit (LFT) 33 as in the conventional router described earlier. The LFT 33 transmits the IP frame to the intended destination via the network.

Figure 1:
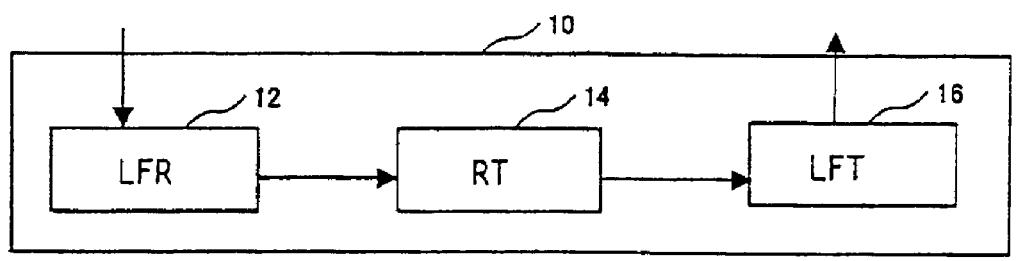
FIG. 1 is a block diagram of a conventional router.

In FIG. 4, the LFR 21, the RT 32 and the LFT 33 are essentially the same as the corresponding elements 12, 14 and 16 of the conventional router shown in FIG. 1.

In the communication apparatus of FIG. 4, when multiple IP frames from the MDD 22 are received as described above, the MCD 23 detects whether the received IP frames contain identical messages. Specifically, in the present embodiment, the MCD 23 detects whether the message identifiers, contained in the header portions of the received IP frames, match with each other. When the result of the detection is affirmative, the MCD 23 passes the multiple IP frames together on to a mail frame assembling unit (MFA) 24.

In the communication apparatus of FIG. 4, a next-node equipment selection unit (NES) 28 outputs a selected next-node equipment identifier (which indicates, for example, a specific router in the IP network) to the MFA 24 at the time the multiple IP frames from the MCD 23 are received at the MFA 24. The MFA 24 receives the selected next-node equipment ID from the NES 28. At the same time, the MFA 24 assembles the multiple IP frames into an integrated IP frame. The MFA 24 passes the integrated IP frame and the selected next-node equipment ID on to the RT 32. The RT 32 performs the routing of the integrated IP frame to the selected next-node equipment, and passes the integrated IP frame on to the LFT 33. The LFT 33 transmits the integrated IP frame to the selected next-node equipment via the network.

In the communication apparatus of FIG. 4, a conformance equipment detection unit (CED) 29 supplies, in response to a request from the NES 28, a next-node conformance equipment identifier to the NES 28. The next-node conformance equipment ID indicates the selected next-node equipment that conforms to the data transfer method of the present invention, and a corresponding IP frame is sent from the LFT 33 to such selected equipment.

In the communication apparatus of FIG. 4, when an integrated IP frame from a preceding-node equipment of the network is received at the LFR 21, a mail frame distributing unit (MFD) 34 passes the received integrated IP frame on to the RT 32 in order to distribute the integrated IP frame from this communication apparatus to multiple destinations of the network indicated by the integrated IP frame. The MFD 34 detects whether a failure has occurred in existing mail servers of the network and their transmission lines.

The MFA 24 is capable of delivering the integrated mail frames to the RT 32 every time the multiple mail frames are received from the MCD 23. With the capability of the MFA 24, it is possible to achieve real-time mail transfer without storing the multiple mail frames in the communication apparatus.

In the communication apparatus of FIG. 4, a mail transmission timing control unit (MTT) 25 is provided with a mail storage device (MST) 26. The MTT 25 is capable of requesting the MST 26 to temporarily store the received mail frames therein. A network traffic extraction unit (NTE) 27 detects whether the data traffic in the network is lower than a given reference level. When the network traffic is detected as being lower than the reference level, the MTT 25 sends the stored mail frames from the MST 26, to the MFA 24. At this time, the LFT 33 transmits such mail frames to the intended destination via the network.

In the communication apparatus of FIG. 4, a next-node equipment collecting unit (NEC) 31 receives an optimum next-node equipment identifier from an external system (not shown). When the NEC 31 is requested by the NES 28, the NEC 31 supplies the optimum next-node equipment ID to the NES 28. A next-node equipment determination unit (NED) 30 determines, by itself, an optimum next-node equipment identifier from a communication equipment list by using the CED 29. The communication equipment list contains a set of predetermined communication equipment identifiers that indicate communication devices using the data transfer method of the present invention. The NED 30 does not use information received from an external system, and selects, by itself, one of those equipment identifiers of the communication equipment list, as the optimum next-node equipment ID, based on the information received from the CED 29. When the NED 30 is requested by the NES 28, the NED 30 supplies the optimum next-node equipment ID to the NES 28.

In the communication apparatus of FIG. 4, a failure notification unit (FN) 35 notifies the failure information as to the existing mail servers of the network and their transmission lines, which is received from the network via the MFD 34, to the MFA 24. When the failure information from the FN 35 is received, the MFA 24 causes a mail transfer cancellation unit (MTC) 36 to partially cancel the transfer of the corresponding mail frame to the mail server that is detected as being defective or in failure. The MFA 24 controls the RT 32 and the LFT 33 so that the transfer of the mail frames to the other mail servers, which are detected as being normal, is not affected by the partial cancellation by the MTC 36.

Figure 2:
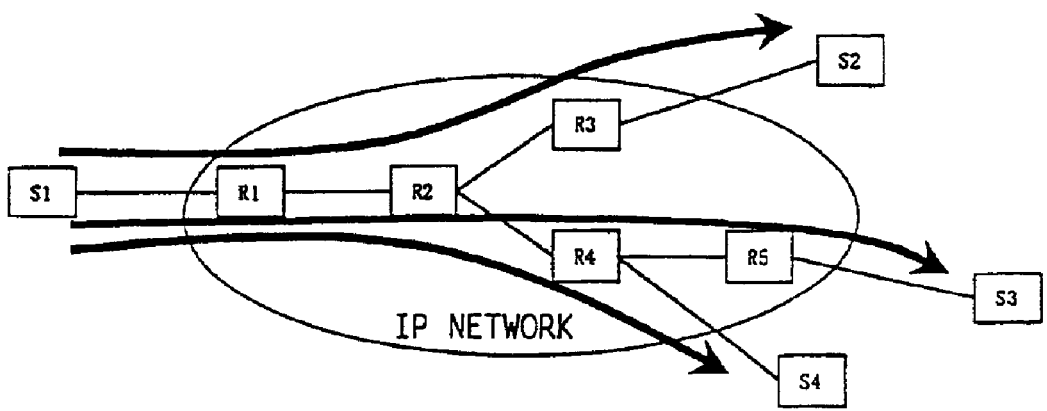
FIG. 2 is a diagram for explaining a transfer of multiple mails across a network using a conventional mail transfer method, the mails including identical messages and different destinations.
Figure 3:
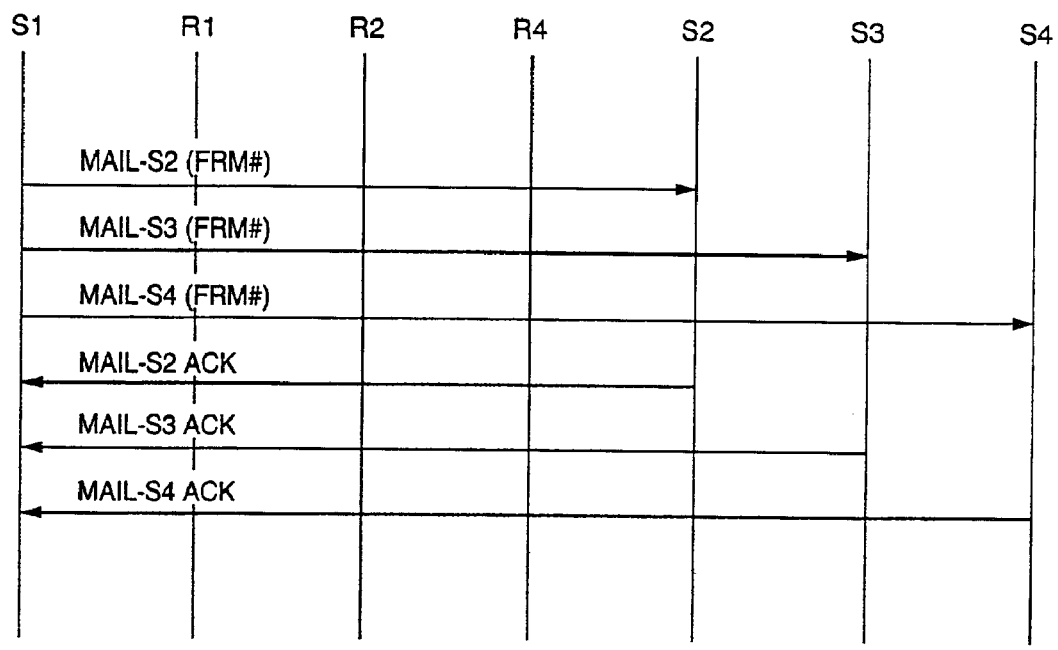
FIG. 3 is a sequence diagram for explaining a communication sequence when the mail transfer is performed as shown in FIG. 2.

It should be noted that the communication apparatus of FIG. 4 is applicable to any communication unit, such as a router or a server, which is provided at arbitrary one of a plurality of intermediate switching nodes of the existing network, such as the IP network shown in FIG. 2.

Next, a description will be given, with reference to FIG. 5, of a communication sequence of a conventional mail transfer method which makes use of the simple mail transfer protocol (SMTP).

Figure 5:
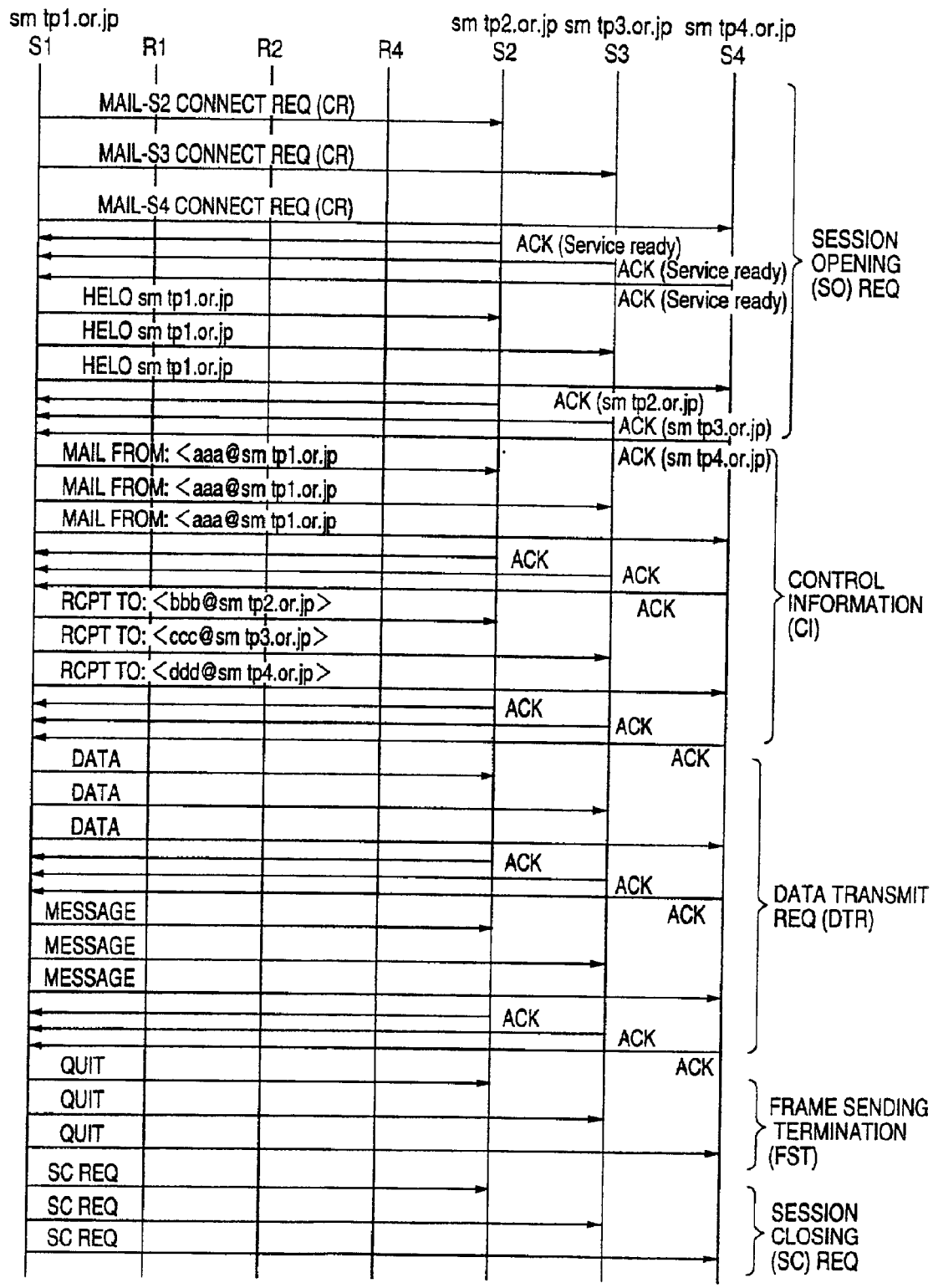
FIG. 5 is a sequence diagram for explaining a communication sequence of a conventional mail transfer method.

Suppose that, in the mail transfer sequence of FIG. 5, the mail server S1 is the source that sends three mails to the IP network, and the mail servers S2, S3 and S4 are the respective destinations that receive the mails from the IP network. One of the mails (indicated by "MAIL-S2" in FIG. 5) is sent from S1 to S2, the second (indicated by "MAIL-S3" in FIG. 5) is sent from S1 to S3, and the last (indicated by "MAIL-S4" in FIG. 5) is sent from S1 to S4. The three mails include identical messages (frame#n) and different destinations (S2, S3, S4). The mails are transmitted at the same time through the routers R1, R2, R3, R4 and R5 in the network to the respective destinations.

Suppose that, in the mail transfer sequence of FIG. 5, the domain name of the mail server S1 is "smtp1.or.jp", the domain name of the mail server S2 is "smtp2.or.jp", the domain name of the mail server S3 is "smtp3.or.jp", and the domain name of the mail server S4 is "smtp4.or.jp".

As shown in FIG. 5, when transmitting the multiple mails from the server S1 to the servers S2, S3 and S4, the mails including the identical messages are simultaneously transferred from the server S1 to the servers S2, S3 and S4, independently. The mail server S1 (the source) sends a connection request of the MAIL-S2 to the server S2, sends a connection request of the MAIL-S3 to the server S3, and sends a connection request of the MAIL-S4 to the server S4. Each of the servers S2, S3 and S4 returns acknowledgement (service ready) to the connection request to the server S1. The TCP-based connection between the servers S1 and S2, the TCP-based connection between the servers S1 and S3, and the TCP-based connection between the servers S1 and S4 are respectively established. Hereinafter, the connection request will be called the CR, and the acknowledgement will be called the ACK.

The server S1 sends a HELO command, including the domain name (smtp1.or.jp), to each of the servers S2, S3 and S4 through the corresponding TCP connection. Each of the servers S2, S3 and S4 returns the ACK to the command, including the corresponding domain name, to the server S1. In the mail transfer sequence of FIG. 5, the session opening (SO) requests, sent from the server S1, are accepted by the servers S2, S3 and S4 in this manner. Hereinafter, the session opening request will be called the SO.

After the session opening requests (SO) are accepted, the server S1 sends a MAIL_FROM command, including the source mail address, and a RCPT_TO command, including the destination address, to each of the servers S2, S3 and S4. Each of the servers S2, S3 and S4 returns the ACK to each of the commands, to the server S1. In the mail transfer sequence of FIG. 5, the control information, including the source mail address and the destination address, sent from the server S1, are received by the servers S2, S3 and S4 in this manner. Hereinafter, the control information notification will be called the CI.

After the control information notification (CI) is performed, the server S1 sends a DATA command, including the SMTP header of each mail frame to each of the servers S2, S3 and S4. The SMTP header contains a message identifier (frame#) that provides identification of messages contained in the mail frame. Each of the servers S2, S3 and S4 returns the ACK to the command, to the server S1. After the DATA command is accepted, the transmission of the messages of each mail frame from the server S1 to each of the servers S2, S3 and S4 is started. When the end of the message transmission is detected, each of the servers S2, S3 and S4 returns the ACK (or EOT) to the server S1. In the mail transfer sequence of FIG. 5, the data transmission requests, sent from the server S1, are accepted by the servers S2, S3 and S4 in this manner. Hereinafter, the data transmission request will be called the DTR.

After the message transmission is completed, the server S1 sends a QUIT command to each of the servers S2, S3 and S4. Each of the servers S2, S3 and S4 returns the ACK to the command, to the server S1. In the mail transfer sequence of FIG. 5, the frame sending termination, sent from the server S1, is detected by the servers S2, S3 and S4, in this manner. Hereinafter, the frame sending termination will be called the FST.

After the frame sending termination is detected, the server S1 sends a session closing request to each of the servers S2, S3 and S4. In the mail transfer sequence of FIG. 5, the session closing request, sent from the server S1, is detected by the servers S2, S3 and S4, in this manner, and the TCP connections between the server S1 and the servers S2, S3 and S4 are released. Hereinafter, the session closing request will be called the SC request.

As described earlier, in the conventional mail transfer method, the routers, such as the routers R1, R2, R3 and R4 in FIG. 5, are not provided with a mechanism for recognizing that multiple mail frames, including identical messages and different destinations, are transferred across the network from the source and the destinations. The respective mail frames, sent from the source server, are merely routed to the next-node equipment of the network by such routers, which will cause significant increase of the mail traffic on the transmission lines of such routers in the network.

In order to eliminate the problem of the conventional mail transfer method, in the data transfer method and apparatus of the present invention, the multiple data frames that are detected as containing identical messages and different destinations are assembled, at a first router, into an integrated data frame, and only the integrated data frame is transferred from the first router to one or more second routers.

Figure 6:
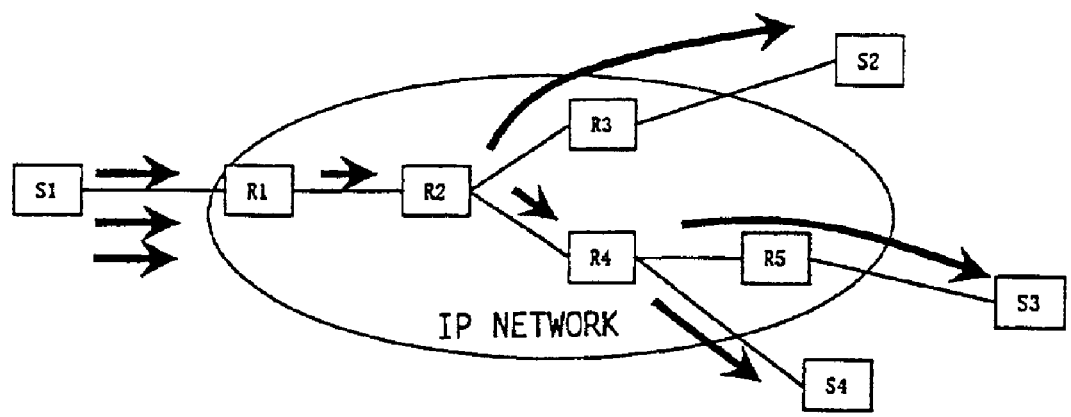
FIG. 6 is a diagram for explaining a transfer of multiple mails across a network using the data transfer method of the invention, the mails including identical messages and different destinations.

FIG. 6 shows a transfer of multiple mails across the IP network using the data transfer method of the invention, the mails including identical messages and different destinations. As shown in FIG. 6, the integrated mail frame is created from the received multiple mail frames at the router R1, and only the integrated mail frame is transferred from the router R1 to the router R3, and only the integrated mail frame is transferred from the router R2 to the router R4. According to the data transfer method of the present invention, the duplicate transfer of the multiple mail frames from router to router is avoided. Therefore, the data transfer method and apparatus of the present invention are effective in reducing the data traffic in the network when the multiple data frames, including identical message and different destinations, are transmitted from one of the routers of the network to another.

Next, a description will be given, with reference to FIG. 7 through FIG. 11, of operations of one preferred embodiment of the data transfer method and apparatus of the invention which makes use of the simple mail transfer protocol (SMTP).

Figure 7:
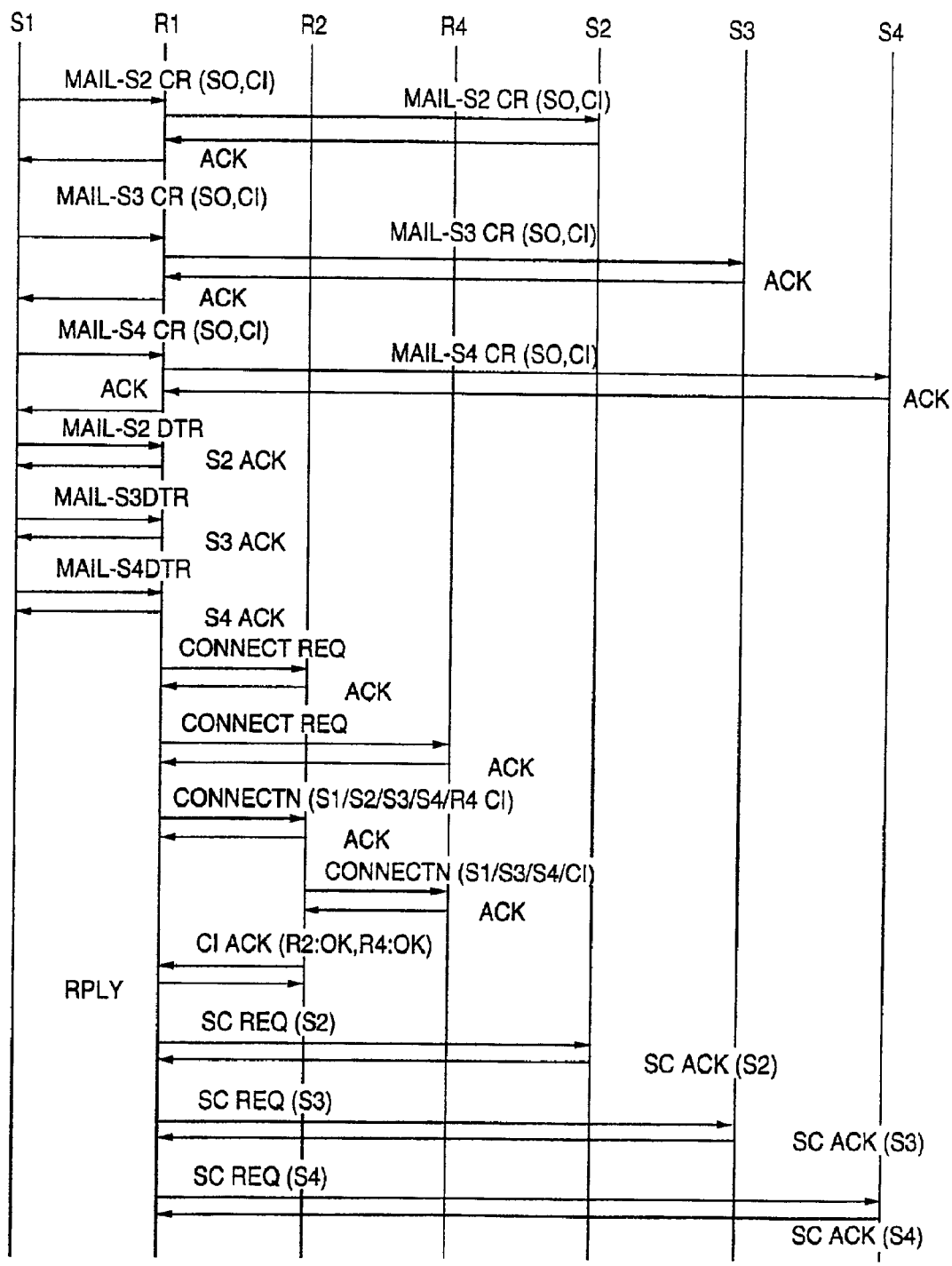
FIG. 7 is a sequence diagram for explaining a communication sequence of one preferred embodiment of the data transfer method of the invention.

FIG. 7 shows a communication sequence of one preferred embodiment of the data transfer method of the invention.

For the sake of simplicity of description, suppose that the IP network to which the data transfer method and apparatus of the invention are applied is the same as the IP network to which the conventional method is applied.

Similar to the conventional method of FIG. 5, suppose that the mail server S1 is the source that sends three mails to the IP network, and the mail servers S2, S3 and S4 are the respective destinations that receive the mails from the IP network. One of the mails (indicated by "MAIL-S2" in FIG. 7) is sent from S1 to S2, the second (indicated by "MAIL-S3" in FIG. 7) is sent from S1 to S3, and the last (indicated by "MAIL-S4" in FIG. 7) is sent from S1 to S4. The three mails include identical messages (frame#n) and different destinations (S2, S3, S4). The mails are transmitted at the same time through the routers R1, R2, R3, R4 and R5 in the network to the respective destinations.

Similar to the conventional method of FIG. 5, suppose that, in the mail transfer sequence of FIG. 7, the domain name of the mail server S1 is "smtp1.or.jp", the domain name of the mail server S2 is "smtp2.or.jp", the domain name of the mail server S3 is "smtp3.or.jp", and the domain name of the mail server S4 is "smtp4.or.jp".

In the communication sequence of FIG. 7, when the server S1 starts the transfer of the multiple mail frames to the servers S2, S3 and S4, the MDD 22 of the router R1 monitors the data frames received from the server S1. The MDD 22 analyses the header portion of each received data frame. The MDD 22 accepts the data frames even when the header portions of the data frames contain a destination IP address that is different from the IP address of the router R1 itself, and, upon reception of each data frame, the router R1 sends the connection requests (CR) to a corresponding one of 20 the destination servers S2, S3 and S4, instead of the source server S1 as in the conventional method of FIG. 5. Moreover, the router R1 sends the session opening requests (SO) and the control information units (CI) to the servers S2, S3 and S4, instead of the server S1.

Figure 12:
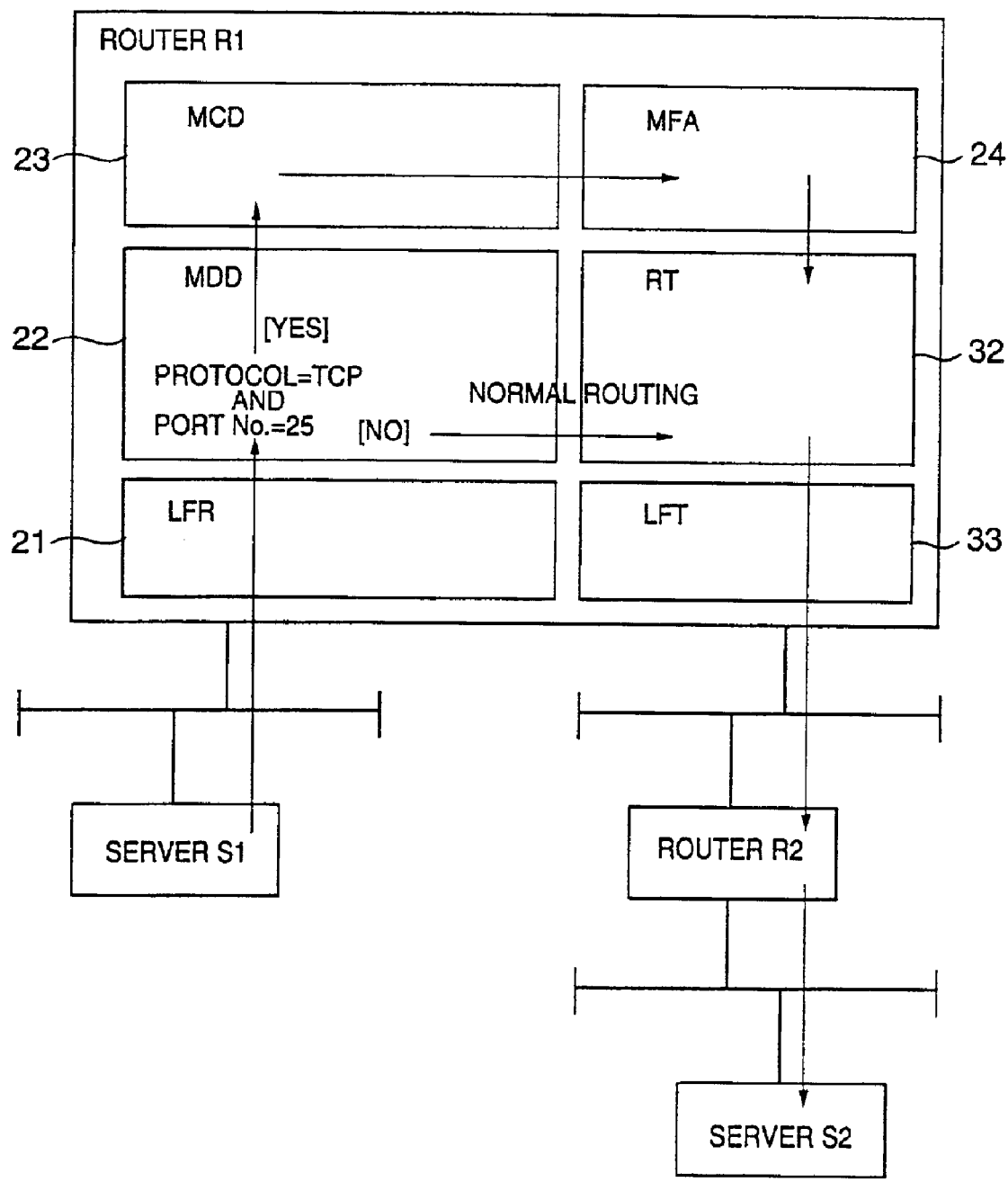
FIG. 12 is a block diagram of a router of the network in which the data transfer method and apparatus of the invention are embodied.

FIG. 12 shows a configuration of the router R1 in which the data transfer method and apparatus of the invention are embodied.

As shown in FIG. 12, in the router R1, the MDD 22 detects whether a protocol and a port number, contained in the header portion of each received frame, match with "TCP" and "25" (which indicates SMTP), respectively. When a match occurs, the MDD 22 passes the received data frame on to the MCD 23. Upon reception of the data frame, the router R1 sends the corresponding connection request (CR) to the corresponding one of the destination servers S2, S3 and S4.

Referring back to FIG. 7, upon reception of each data frame from the server S1, the router R1 sends the connection requests (CR) to the corresponding one of the destination servers S2, S3 and S4, based on the source IP address and the destination IP address contained in the header portion of each received data frame. Moreover, with respect to each of the three mails, the router R1 sends the session opening requests (SO) and the control information units (CI) to the servers S2, S3 and S4.

As shown in FIG. 7, every time the data transmission request (DTR) of one of the three mails from the server S1 is received, the router R1 sends a dummy ACK back to the server S1 for each of the three mails. During this period, the MCD 23 of the router R1, shown in FIG. 12, detects whether the received data frames contain identical messages. Specifically, the MCD 23 detects whether the message identifiers, contained in the header portions of the received data frames, match with each other. When the result of the detection is affirmative, the MCD 23 passes the multiple data frames together on to the MFA 24.

Further, in the router R1, the next-node equipment selection unit (NES) 28 (described above with reference to FIG. 4) supplies a selected next-node equipment identifier to the MFA 24 at the time the multiple data frames from the MCD 23 are received at the MFA 24. When a given time has elapsed after the reception of the multiple mail transfer request, the NES 28 of the router R1 performs a route tracing process based on the destination information of the received data frames, so that the router R1 recognizes specific routes through the routers of the IP network to the destination servers S2, S3 and S4. As a result of the route tracing process, in the present example, the NES 28 of the router R1 selects the router R2 as the next-node equipment for the destination server S2, and selects the router R4 as the next-node equipment for the destination servers S3 and S4.

FIG. 13A, FIG. 13B and FIG. 13C are diagrams for explaining mail control information retained by the router R1 of the IP network.

In the present embodiment, the router R1 retains mail control information of the router R1 (also called the assembling router ASSM RTR), shown in FIG. 13A, mail control information of the router R2 (also called the distributed router DST RTR), shown in FIG. 13B, and mail control information of the router R4 (also called the distributed router DST RTR), shown in FIG. 13C.

As shown in FIG. 7, the router R1 sends the connection request to the router R2, and, when the ACK to the request from the router R2 is received, the router R1 transmits a data frame, containing the control information (CI) of the source server S1 and the control information (CI) of the destination servers S2, S3 and S4, to the router R2. The router R1 sends the connection request to the router R4 via the router R2, and, when the ACK to the request from the router R4 is received, the router R1 transmits a data frame, containing the control information (CI) of the source server S1 and the control information (CI) of the destination servers S3 and S4, to the router R4.

FIG. 14 is a diagram for explaining the format of the mail control information used by the data transfer method of the invention.

As shown in FIG. 14, the mail control information is divided into an IP header portion, a TCP header portion and a data portion. The data portion is divided into a control part and an information part. In the control part, a source IP address, an assembling router IP address, a group identifier, a data type (0: recording, 1: canceling, 2: acknowledge, 3: frame information), and a data transfer result (0: normal, 1: abnormal) are defined. In the information part, connection information, including sender information, distributed router information, a destination IP address, a frame processing condition and receiver information, frame information, including a mail frame, and failure information, including a failed distributed router IP address, a destination IP address, receiver information and detailed failure information, are defined.

Referring back to FIG. 7, upon reception of the CI ACK from the router R4, the router R2 sends the CI ACK, including the acknowledgement of the connections with the routers R2 and R4, to the router R1. After the CI ACK from the router R2 is received, the router R1 sends the session closing (SC) request to each of the servers S2, S3 and S4 with respect to the corresponding one of the three mails (MAIL-S2, MAIL-S3, MAIL-S4).

Figure 8:
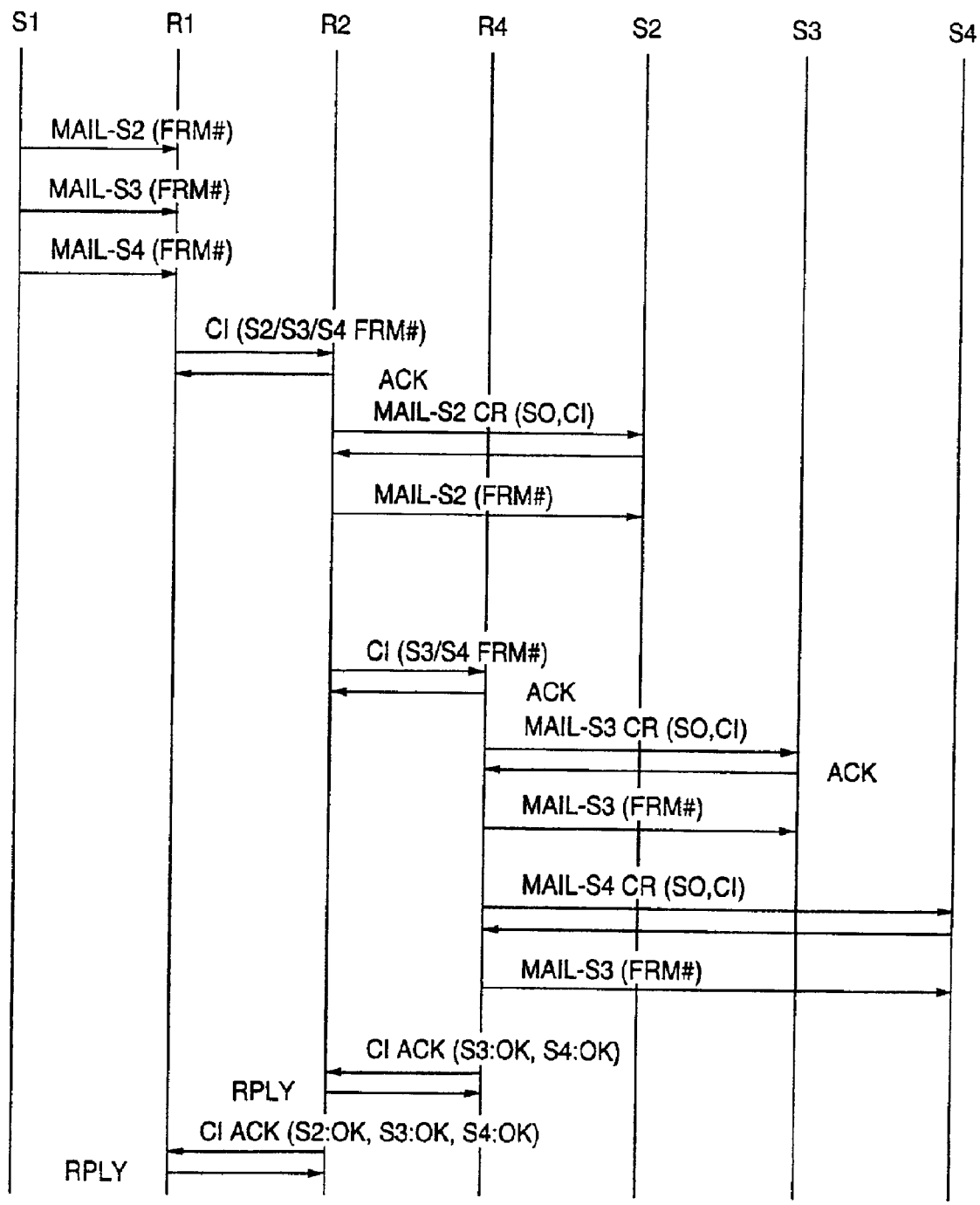
FIG. 8 is a sequence diagram for explaining a communication sequence of the data transfer method of the present embodiment.

FIG. 8 shows a communication sequence of one preferred embodiment of the data transfer method of the invention following the communication sequence of FIG. 7 described above.

As shown in FIG. 8, when the multiple mail frames including the messages (frame#n) from the server Si are received at the router R1, the router R1 transmits the integrated mail frame including the messages (frame#n), together with the control information CI of the three mails (MAIL-S2, MAIL-S3, MAIL-S4), to the router R2. Then, the router R2 sends the connection request (CR), the session opening request (SO) and the control information (CI) to the server S2, based on the CI received from the router R1. After this, the router R2 transmits the mail frame (MAIL-S2), including the messages (frame#n), to the server S2 via the router R3. Further, the router R2 transmits the integrated mail frame (MAIL-S3, MAIL-S4), including the messages (frame#n) and the CI, to the router R4.

Similarly, the router R4 sends the connection request (CR), the session opening request (SO) and the control information (CI) to the server S3, based on the CI received from the router R2. After this, the router R4 transmits the mail frame (MAIL-S3), including the messages (frame#n), to the server S3. Further, the router R4 sends the connection request (CR), the session opening request (SO) and the control information (CI) to the server S4, based on the CI received from the router R2. After this, the router R4 transmits the mail frame (MAIL-S4), including the messages (frame#n), to the server S4.

When the mail transfer (MAIL-S3, MAIL-S4) is normally performed, the router R4 sends the CI ACK, including the acknowledgement of the connections with S3 and S4, to the router R2. After the CI ACK from the router R4 is received, the router R2 sends the CI ACK, including the acknowledgement of the connections with S2, S3 and S4, to the router R1. Hence, at the assembling router R1, it is recognized that the multiple mail transfer (MAIL-S2, MAIL-S3, MAIL-S4) is normally performed.

Figure 9:
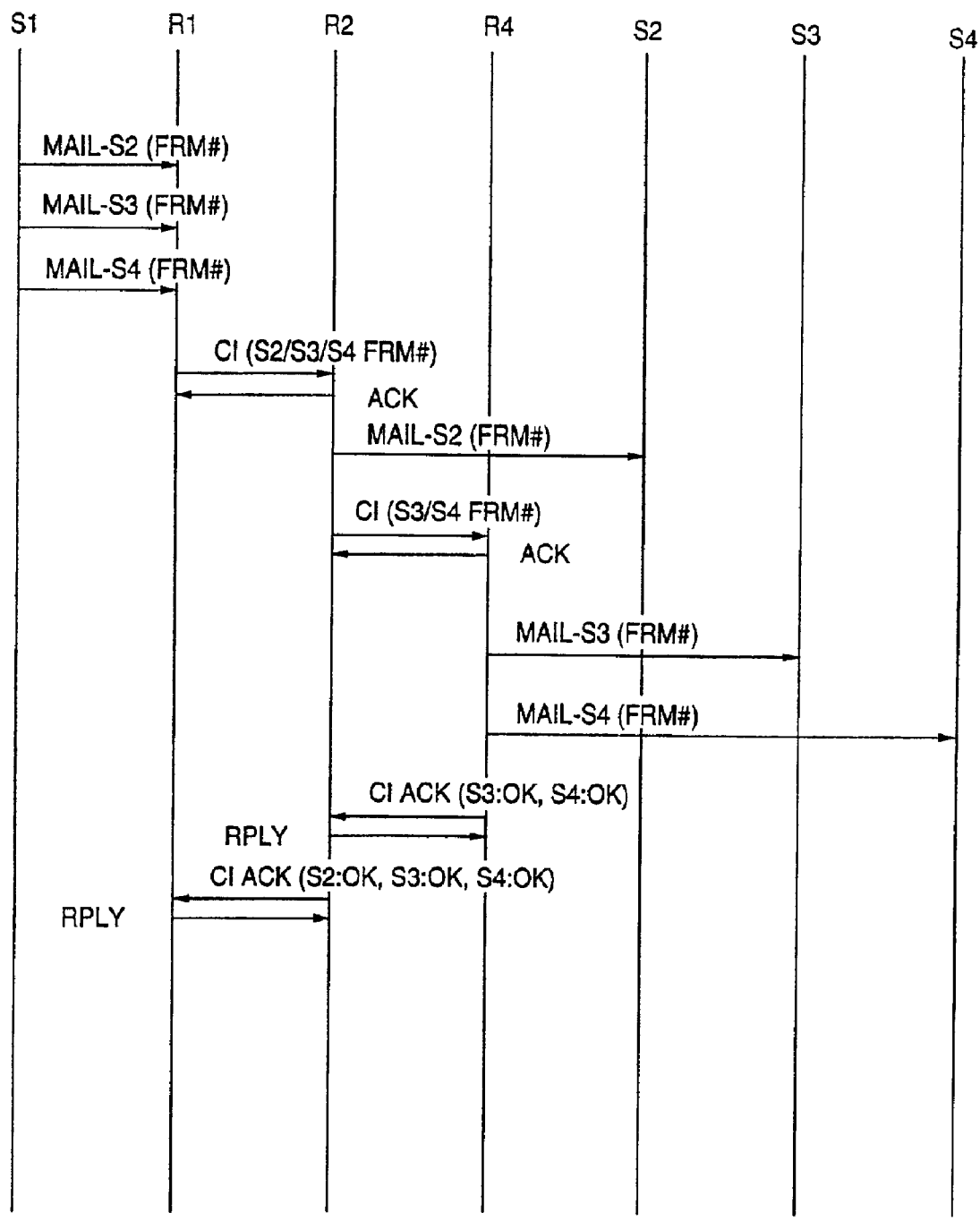
FIG. 9 is a sequence diagram for explaining a communication sequence of the data transfer method of the present embodiment.

FIG. 9 shows an alternative to the communication sequence of FIG. 8 described above.

As shown in FIG. 9, when the multiple mail frames including the messages (frame#n) from the server S1 are received at the router R1, the router R1 transmits the integrated mail frame including the messages (frame#n), together with the control information CI of the three mails (MAIL-S2, MAIL-S3, MAIL-S4), to the router R2. Then, the router R2 transmits the mail frame (MAIL-S2), including the messages (frame#n), to the server S2 via the router R3. Further, the router R2 transmits the integrated mail frame, including the messages (frame#n) and the CI of the two mails (MAIL-S3, MAIL-S4), to the router R4.

Similarly, the router R4 transmits the mail frame (MAIL-S3), including the messages (frame#n), to the server S3. Further, the router R4 transmits the mail frame (MAIL-S4), including the messages (frame#n), to the server S4.

When the mail transfer (MAIL-S3, MAIL-S4) is normally performed, the router R4 sends the CI ACK, including the acknowledgement of the connections with S3 and S4, to the router R2. After the CI ACK from the router R4 is received, the router R2 sends the CI ACK, including the acknowledgement of the connections with S2, S3 and S4, to the router R1. Hence, at the assembling router R1, it is recognized that the multiple mail transfer (MAIL-S2, MAIL-S3, MAIL-S4) is normally performed.

Figure 10:
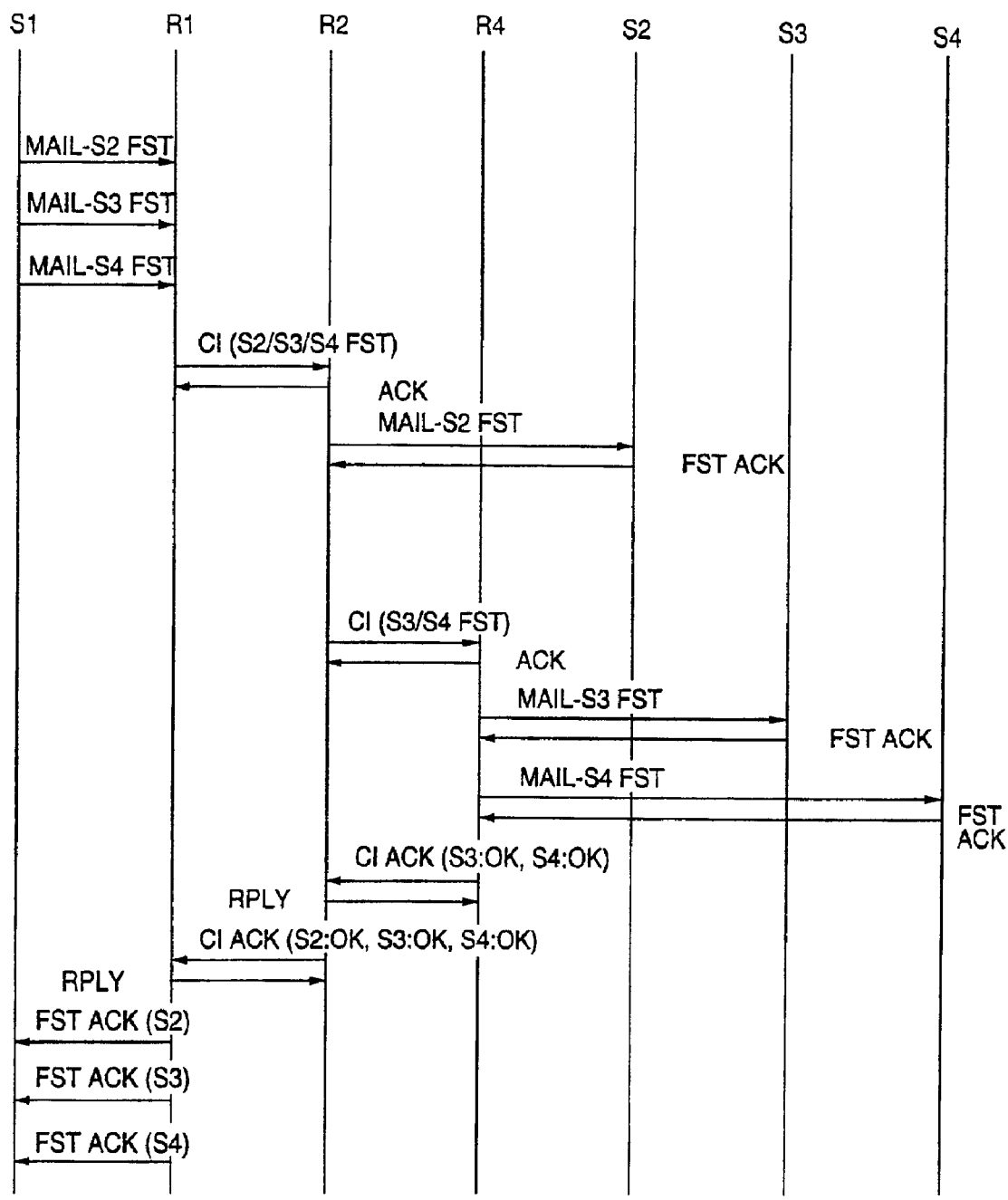
FIG. 10 is a sequence diagram for explaining a communication sequence of the data transfer method of the present embodiment.

FIG. 10 shows a communication sequence of one preferred embodiment of the data transfer method of the invention following either the communication sequence of FIG. 8 or the communication sequence of FIG. 9.

As shown in FIG. 10, when the frame sending termination (FST) of the three mails (MAIL-S2, MAIL-S3, MAIL-S4) from the server S1 are received at the router R1, the router R1 sends the control information (CI) of the MAIL-S2, including the FST, to the router R2, instead of the server S1 of the conventional mail transfer method which sends the FST directly to the server S2. Then, the router R2 sends the frame sending termination (FST) of the MAIL-S2 to the server S2, based on the CI received from the router R1. The router R2 receives the FST ACK from the server S2.

After this, the router R2 sends the control information (CI) of the two mails (MAIL-S3, MAIL-S4), including the FST, to the router R4. The router R4 sends the frame sending termination (FST) of the MAIL-S3 to the server S3 based on the CI received from the router R2, instead of the server S1 of the conventional mail transfer method which sends the FST directly to the server S3. The router R4 receives the FST ACK from the server S3.

Similarly, the router R4 sends the frame sending termination (FST) of the MAIL-S4 to the server S4 based on the CI received from the router R2, instead of the server S1 of the conventional mail transfer method which sends the FST directly to the server S4. The router R4 receives the FST ACK from the server S4.

When the FST ACK from the server S4 is received, the router R4 sends the CI ACK, including the acknowledgement of the connections with S3 and S4, to the router R2. After the CI ACK from the router R4 is received, the router R2 sends the CI ACK, including the acknowledgement of the connections with S2, S3 and S4, to the router R1. At the router R1, it is recognized that the frame sending termination (MAIL-S2, MAIL-S3, MAIL-S4) is normally performed. The router R1 sends the FST ACK of each of the three mails to the source server S1.

Figure 11:
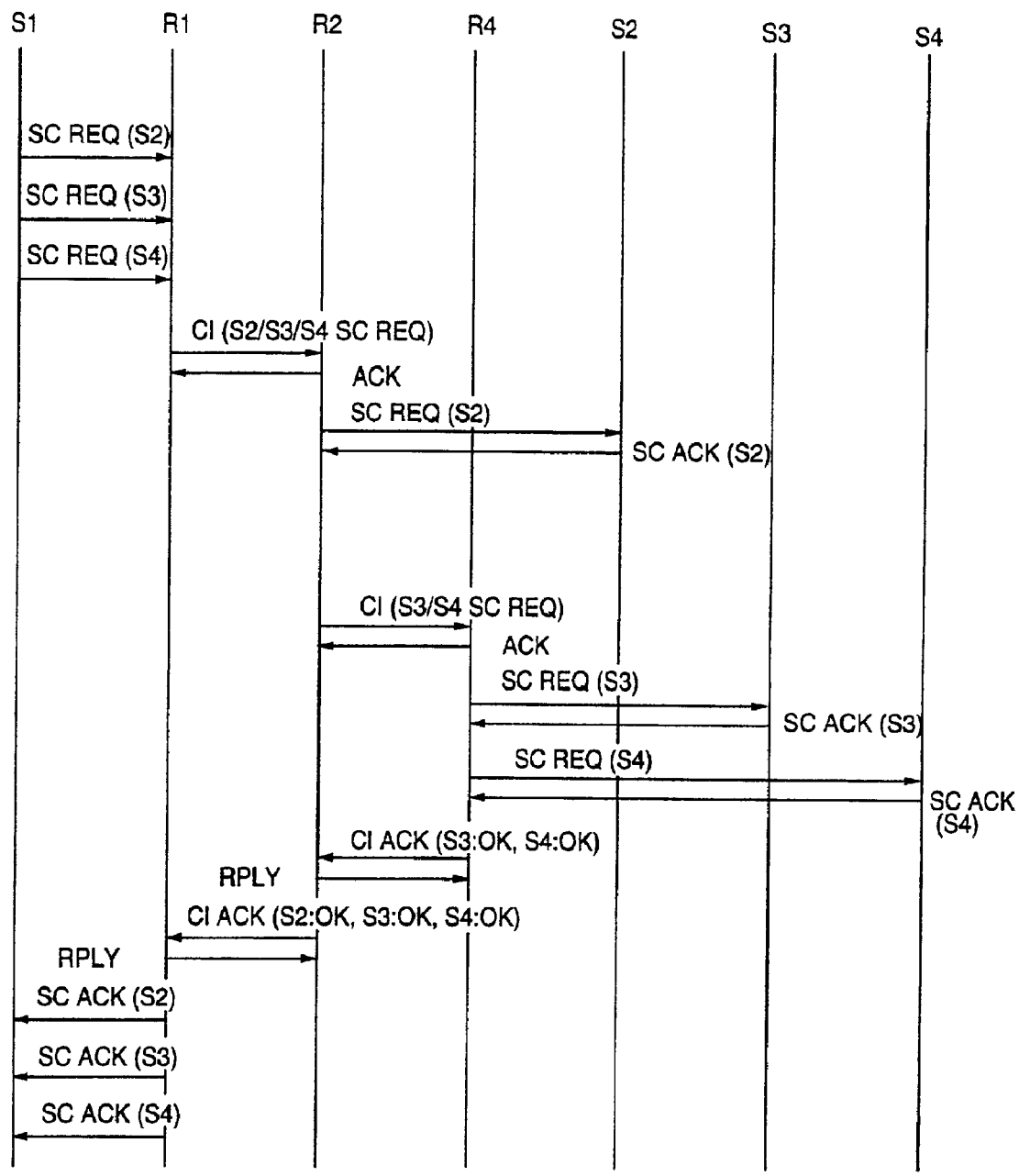
FIG. 11 is a sequence diagram for explaining a communication sequence of the data transfer method of the present embodiment.

FIG. 11 shows a communication sequence of one preferred embodiment of the data transfer method of the invention following the communication sequence of FIG. 10 described above.

As shown in FIG. 11, when the session closing (SC) requests of the three mails (MAIL-S2, MAIL-S3, MAIL-S4) from the server S1 are received at the router R1, the router R1 sends the control information (CI) of the three mails (MAIL-S2, MAIL-S3, MAIL-S4), including the SC request, to the router R2, instead of the server S1 of the conventional method which sends the SC requests directly to the servers S2, S3 and S4. Then, the router R2 sends the control information (CI) of the MAIL-S2, including the SC request, to the server S2, based on the CI received from the router R1. The router R2 receives the SC ACK from the server S2.

After this, the router R2 sends the control information (CI) of the two mails (MAIL-S3, MAIL-S4), including the SC request, to the router R4. The router R4 sends the SC request of the MAIL-S3 to the server S3 based on the CI received from the router R2, instead of the server S1 of the conventional method. The router R4 receives the SC ACK from the server S3.

Similarly, the router R4 sends the Sc request of the MAIL-S4 to the server S4 based on the CI received from the router R2, instead of the server S1 of the conventional method. The router R4 receives the SC ACK from the server S4.

When the SC ACK from the server S4 is received, the router R4 sends the CI ACK, including the acknowledgement of the connections with S3 and S4, to the router R2. After the CI ACK from the router R4 is received, the router R2 sends the CI ACK, including the acknowledgement of the connections with S2, S3 and S4, to the router R1. At the router R1, it is recognized that the session closing (MAIL-S2, MAIL-S3, MAIL-S4) is normally performed. The router R1 sends the SC ACK of each of the three mails to the source server S1, instead of the servers S2, S3 and S4 of the conventional method which send the SC ACK directly to the server S1.

Next, a description will be given, with reference to FIG. 15 through FIG. 17, of route recognition of the router R1 in which the data transfer method and apparatus of the invention are embodied.

Figure 15:
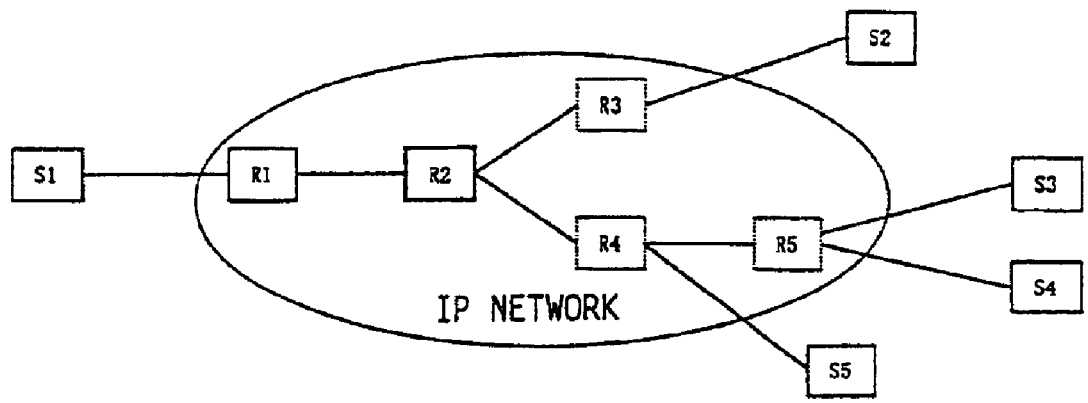
FIG. 15 is a diagram for explaining route recognition of the router in which the data transfer method and apparatus of the invention are embodied.

When a mail transfer request from the server S1, which requests the transfer of multiple mail frames including identical messages and different destinations (S2, S3, S4, S5) is just received, the router R1 of the IP network does not recognize the routers R2 through R5 or the routes needed for the mail transfer, and it is in a state shown in FIG. 15, which will be referred to as the state 1.

Figure 16:
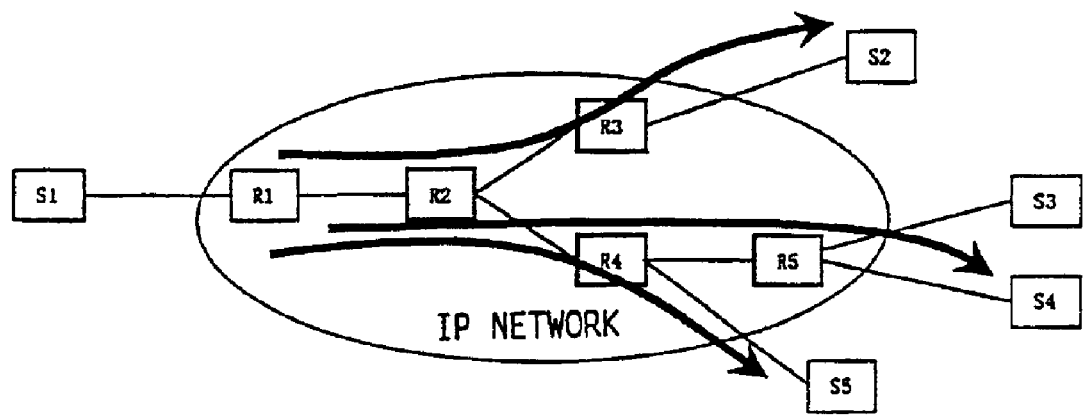
FIG. 16 is a diagram for explaining route recognition of the router in which the data transfer method and apparatus of the invention are embodied.

In a state shown in FIG. 16, which will be referred to as the state 2, the NES 28 of the router R1 performs the route tracing process based on the destination information of the received data frames, so that the router R1 recognizes specific routes through the routers of the network to the destination servers S2–S5. In the state 2, the NES 28 of the router R1 recognizes the following information:

[Information 1] MAIL-S2: R2→R3
MAIL-S3: R2→R4→R5
MAIL-S4: R2→R4→R5
MAIL-S5: R2→R4

However, in the state 2, the router R1 does not recognize that the routers R2 through R5 are in conformance with the data transfer method of the invention.

Figure 17:
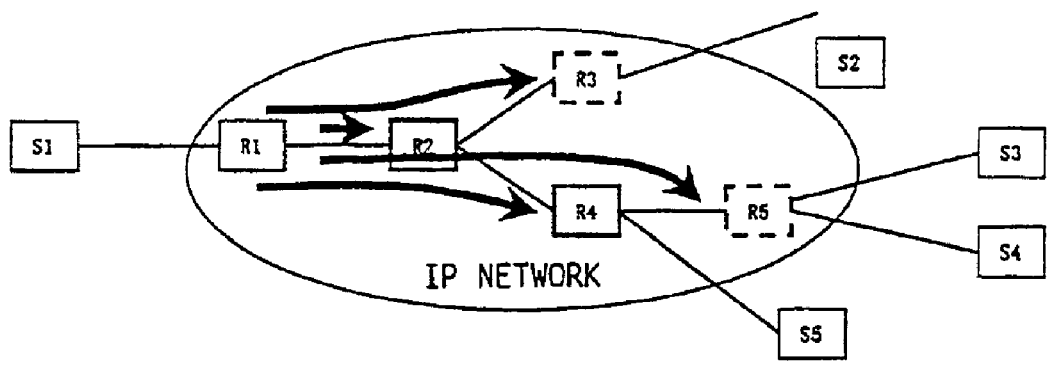
FIG. 17 is a diagram for explaining route recognition of the router in which the data transfer method and apparatus of the invention are embodied.

In a state shown in FIG. 17, which will be referred to as the state 3, the CED 29 of the router R1 supplies, in response to a request from the NES 28, a next-node conformance equipment identifier to the NES 28. To attain this function, the CED 29 sends an IP frame, containing a specific port number (indicating the distributed router function), to each of the routers R2–R5, and receives the responses (echo or reply according to the ICMP protocol) from the respective routers. When an erroneous response from one of the routers is received, it is determined that that router is not in conformance with the data transfer method of the invention.

When a normal response from one of the routers is received, the CED 29 detects the router identifier from the response as the next-node equipment ID that indicates the selected next-node equipment that conforms to the data transfer method of the invention. In the state 3, the NES 28 of the router R1 recognizes the following information:

[Information 2] R2, R4: conformance equipment
R3, R5: non-conformance equipment

In FIG. 17, the routers R3 and R5 are indicated by the dotted lines, which indicates they do not conform to the data transfer method of the invention.

Further, the NED 30 of the router R1 produces a communication equipment list (which contains, for example, the equipment identifiers of the routers R2 and R4) based on the information received from the CED 29, and determines an optimum next-node equipment identifier based on the communication equipment list. Specifically, the NED 30 selects the router R2 as the optimum next-node equipment ID, which routes the integrated mail frame of the four mails (MAIL-S2, MAIL-S3, MAIL-S4, MAIL-S5) to the following routers R3 and R4, and selects the router R4 as the optimum next-node equipment ID, which routes the integrated mail frame of the three mails (MAIL-S3, MAIL-S4, MAIL-S5) to the following router R5.

Figure 18:
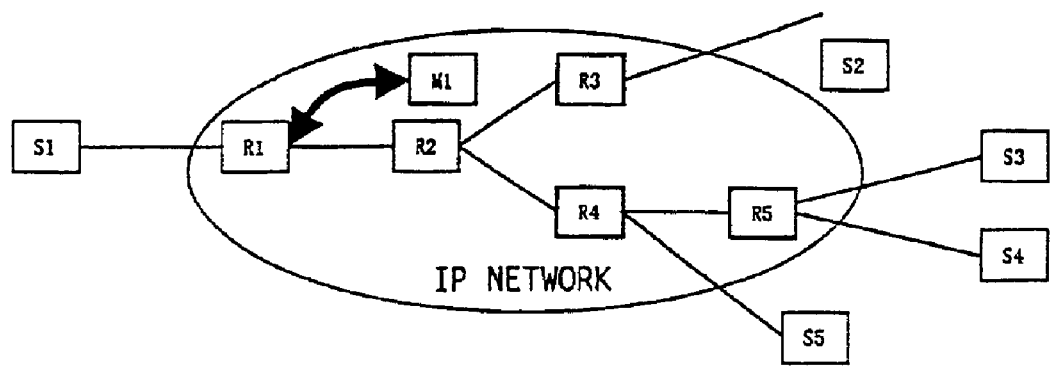
FIG. 18 is a diagram for explaining a next-node equipment information collection of the router in which the data transfer method and apparatus of the invention are embodied.

FIG. 18 shows a next-node router information collection of the router R1 in which the data transfer method and apparatus of the invention are embodied.

As shown in FIG. 18, the NTE 27 of the router R1 extracts the data traffic in the transmission lines of the routers R2 through R5 or in the entire network at intervals of a given time. In order to achieve this function, for example, the NTE 27 of the router R1 receives statistical data from a network management mail server M1, which is provided in the network, by using a network management protocol such as SNMP.

When the data traffic in the transmission lines of the routers or in the entire network, extracted by the NTE 27, is detected as being higher than the reference level, the NTE 27 causes the MST 26 to store all the received mail frames in the router R1. In addition, when the size of a received mail frame at the router R1 exceeds a given maximum size, the NTE 27 causes the MST 26 to store all the received mail frames in the router R1.

Figure 19:
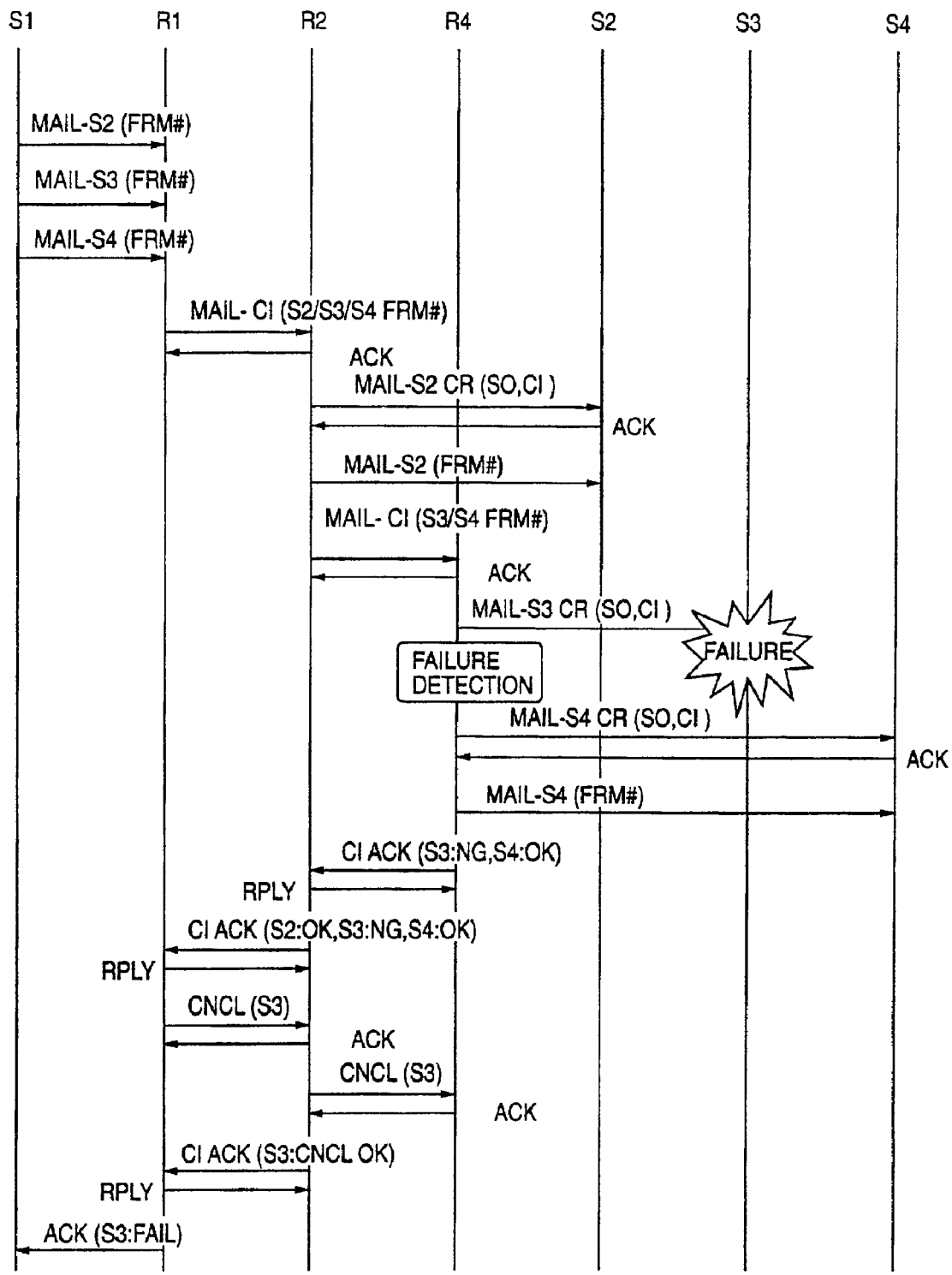
FIG. 19 is a sequence diagram for explaining a communication sequence of the data transfer method and apparatus of the present invention when a failure occurs in the network.

Next, FIG. 19 shows a communication sequence of the data transfer method of the present invention when a failure occurs in the network.

The communication sequence shown in FIG. 19 corresponds to that shown in FIG. 8. Suppose that, in the present embodiment, the MFD 34 of the router R4 has detected a failure in the transmission line to the server S3 during the session opening requesting the server S3. The router R4 continuously sends the connection request (CR) and the control information (CI) to the server S4 by maintaining the connection between R4 and S4. After the mail frame (MAIL-S4) is transmitted to the server S4, the router R4 sends, according to the failure notification function of the FN 35, the CI ACK, containing the failure information (S3: failure, S4: normal), to the router R2.

After the failure information from the router R4 is received, the router R2 sends the CI ACK, including the failure information (S2: normal, S3: failure, S4: normal), to the router R1 in a similar manner. After the failure information from the router R2 is received, the router R1, which is the assembling router, sends, with the partial cancellation function of the MTC 36, a partial cancel command (CNCL) to the router R2, so that only the transfer of the mail frame (MAIL-S3) to the server S3 is canceled at the router R2.

Similarly, the router R1 sends a partial cancel command (CNCL) to the router R4, so that only the transfer of the mail frame (MAIL-S3) to the server S3 is canceled at the router R4.

After the CI ACK, containing the acknowledgement of the partial cancellation of the MAIL-S3, from the router R2 is received, the router R1 sends the CI ACK, containing the failure information (S3: failure), to the server S1.

As described above, according to the data transfer method and apparatus of the present embodiment, the duplicate transfer of the multiple mail frames from router to router is avoided, it is possible to effectively and reliably reduce the data traffic in the network when the multiple data frames, including identical message and different destinations, are transmitted from one of the routers of the network to another. The data transfer method and apparatus of the present embodiment make it possible to provide an effective mechanism for reduction of the increasing mail traffic in the worldwide network spanning multiple domains.

The present invention is not limited to the above-described embodiments, and variations and modifications may be made without departing from the scope of the present invention.

Further, the present invention is based on Japanese priority application No.2000-245257, filed on Aug. 11, 2000, the entire contents of which are hereby incorporated by reference.

What is claimed is:

1. A data transfer method which routes multiple data frames from a preceding node to a next node in a network of communication units, comprising the steps of:

detecting whether the multiple data frames received from the preceding node include different destinations;

detecting whether the data frames that are detected as including different destinations include identical messages;

assembling the data frames that are detected as including different destinations and identical messages into an integrated data frame, so that the integrated data frame is transmitted to the next node;

supplying a selected next-node equipment identifier, the next-node equipment identifier indicating a selected next-node communication unit of the network that receives the integrated data frame; and transmitting, when the selected next-node equipment identifier and the integrated data frame are received, the integrated data frame to the selected next-node communication unit via the network.

2. The data transfer method according to claim 1, further comprising the step of supplying a next-node conformance equipment identifier, the next-node conformance equipment identifier indicating a next-node communication unit that conforms to the data transfer method and is selected from among the communication units of the network.

3. A communication apparatus which routes multiple data frames from a preceding node to a next node in a network of communication units in accordance with a data transfer method, comprising:

a data destination detection unit detecting whether the multiple data frames received from the preceding node include different destinations;

a data content detection unit detecting whether the data frames that are detected as including different destinations include identical messages;

a data frame assembling unit assembling the data frames that are detected as including different destinations and identical messages into an integrated data frame, so that the integrated data frame is transmitted to the next node;

a next-node equipment selection unit supplying a selected next-node equipment identifier, the next-node equipment identifier indicating a selected next-node communication unit of the network that receives the integrated data frame from the data frame assembling unit; and a data frame transmitter unit transmitting, when the selected next-node equipment identifier and the integrated data frame are received, the integrated data frame to the selected next-node communication unit via the network.

4. The communication apparatus according to claim 3, further comprising a conformance equipment detection unit supplying a next-node conformance equipment identifier to the next-node equipment selection unit, the next-node conformance equipment identifier indicating a next-node communication unit that conforms to the data transfer method and is selected from among the communication units of the network.

5. The communication apparatus according to claim 4, further comprising a next-node equipment determination unit determining an optimum next-node equipment identifier from a communication equipment list by using the conformance equipment detection unit.

6. The communication apparatus according to claim 3, further comprising:

a data storage device storing the received data frames;

a network traffic extraction unit detecting whether data traffic in the network is lower than a given reference level; and a data transmission timing control unit sending, when the data traffic in the network is detected as being lower than the reference level, the stored data frames from the data storage device to the data frame assembling unit.

7. The communication apparatus according to claim 3, further comprising a next-node equipment collecting unit receiving an optimum next-node equipment identifier from an external system.

8. The communication apparatus according to claim 3, further comprising:

a failure notification unit notifying failure information as to the communication units of the network and transmission lines thereof to the data frame assembling unit when a failure is detected in the network; and a data transfer cancellation unit partially canceling the transfer of the data frames to the communication unit that is detected as being defective or in failure.

* * * * *